Patented Nov. 30, 1948

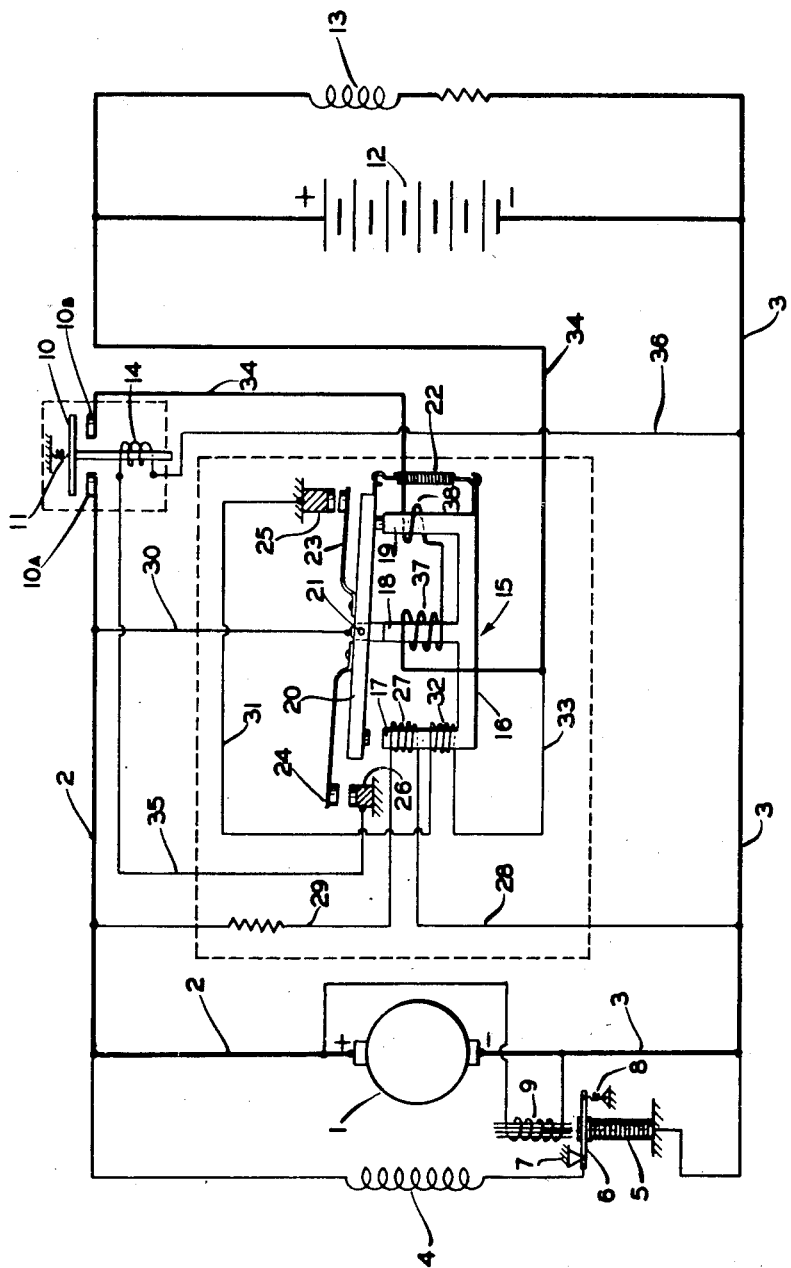

2,455,060

UNITED STATES PATENT OFFICE 2,455,060

REVERSE CURRENT RELAY AND SYSTEM

William R. Holmes, New York, N. Y., assignor to Bendix Aviation Corporation, Teterboro, N. J., a corporation of Delaware Application July 26, 1946, Serial No. 686,484

7 Claims. (Cl. 320—33)

The present invention relates to electrical control systems and devices and more particularly to a novel reverse current relay or switch mechanism for a generator.

An object of the invention is to provide a novel means to connect a generator to a battery circuit when the generator voltage has reached a predetermined value and to disconnect said generator from the battery circuit when the generator voltage drops to a predetermined value or when reverse current flowing from the battery to the generator reaches a predetermined value.

Another object of the invention is to provide a novel means to connect and disconnect the generator and battery circuits as described above, which means will withstand severe vibration immediately prior to and after the predetermined points of operation.

Another object of the invention is to provide a novel means to connect and disconnect the generator and battery circuits as described, which means will withstand severe conditions of acceleration and deceleration without failure or misoperation.

Another object of the invention is to provide a novel means to connect and disconnect the generator and battery circuits as previously described, which means will disconnect the generator from the battery on reverse current flow from the battery to the generator whether the reverse current is small in value or a heavy surge as may occur on opening the generator field switch or as result of a dead short on the generator terminals.

Another object of the invention is to provide a novel means to connect and disconnect the generator and battery circuits as previously described, which means will operate at predetermined values regardless of the attitude or position of the said means with respect to the force of gravity.

Another object of the invention is to provide a novel means to connect and disconnect the generator and battery circuits as herein described, which means will operate at predetermined values within a small range of deviation when used continuously over long periods of time.

Another object of the invention is to build such a means without the use of permanent magnets or small delicate contact making devices or shock mounts.

These and other objects and features of the invention are pointed out in the following description in terms of the embodiment thereof which is shown in the accompanying drawings. It is to be understood, however, that the drawing is for the purpose of illustration only, and is not designed as a definition of the limits of the invention, reference being had to the appended claims for this purpose.

The drawing is a circuit diagram illustrating a control system for a generator and the operation of the novel reverse current relay.

Referring to the drawing, there is shown a generator 1 of conventional type having a positively charged output line 2 and a negatively charged output line 3. Connected across the output lines 2 and 3 is a shunt field winding 4.

A variable resistance carbon pile element 5 controls the energization of the field winding 4 which in turn controls the output of the generator 1 in a manner well known in the art.

The carbon pile element 5 forms one element of a carbon pile regulator shown diagrammatically in the drawing as including an armature 6 pivoted at 7 and exerting a compressive force upon the carbon pile element 5 under tension of a spring 8. The position of the armature 6 is controlled by an electromagnetic winding 9 having a core and exerting an electromagnetic force acting in opposition to the spring 8. The winding 9 is connected across the output lines 2 and 3 of the generator 1. The spring 8 is arranged so as to balance the pull on the armature 6 by the electromagnet 9 when the electromagnet 9 is energized by a generator voltage having a predetermined value.

The regulator is preferably of a type such as shown in the copending patent application Ser. No. 612,691, filed August 25, 1945, by William G. Neild.

A line switch 10 normally biased under tension of a spring 11 into an open position controls the contacts 10A and 10B and thereby the connection of the lines 2 and 3 to a battery 12 and a suitable load 13. The line switch 11 is biased to a position closing contacts 10A and 10B upon energization of an electromagnetic winding 14. The contact 10A is connected to the conductor 2 while the contact 10B is connected as will be explained hereinafter through a suitable conductor to the battery 12 and load 13.

The energization of the electromagnetic winding 14 is controlled by a novel switch mechanism or pilot relay indicated generally by the numeral 15 and which forms the subject matter of the present application.

The relay mechanism 15 includes an E-shaped magnet core 16 formed of a suitable ferro magnetic material having legs 17, 18, and 19. An armature 20 is pivotally mounted at 21 above the center of the middle leg 18. A spring member 22 secured at one end to the E-shaped core 16 and at the other end to the armature 20 normally biases the armature 20 in a clockwise direction about the pivot 21 into the position shown in the drawing.

The armature 20 has mounted thereon and electrically connected to the armature 20 two leaf spring contactors 23 and 24. The contactor 23 cooperates with a switch contact 25, while the contactor 24 cooperates with a switch contact 26. The contactor 23 is arranged to close the contact 25 before the contactor 24 closes the contact 26 upon movement of the armature 20 in a counterclockwise direction in opposition to the biasing force of the spring 22.

On the leg 17 of the E-shaped core 15 there is wound an electromagnetic winding or voltage coil 27 connected through conductors 28 and 29 across the generator output lines 2 and 3. The winding 27 at a predetermined generator output voltage moves the armature 20 in a counterclockwise direction causing contactor 23 to close contact 25.

A conductor 30 leads from line 2 to armature 20 which is electrically connected to contactor 23, while contact 25 is connected by conductor 31 to one end of a second electromagnetic winding or differential current coil 32 on the leg 17. The opposite end of the winding 32 is connected by a conductor 33 to a conductor 34 which leads from the line switch contact 10B to the positive side of the battery 12 and load 13. Thus upon switch contactor 23 closing contact 25 the winding 32 is connected across switch contacts 10A and 10B and in series with the generator 1 and battery 12.

Upon the generator voltage being sufficiently greater than the battery voltage the series or current winding 32 will exert an additive effect on the magnetic force of the winding 27 tending to move the armature 20 against the biasing force of the leaf spring contactor 23, which now engages contact 25, and the biasing force of spring 22 so as to cause switch contactor 24 to close contact 26.

When the voltage of the battery 12 exceeds that of the generator 1, there is a current flow in the opposite direction and from the battery 12 causing the series or current winding 32 to effect a magnet force of opposite polarity to that of the winding 27 and which opposes the magnetic force of the winding 27 so as to tend to nullify the pull of the voltage winding 27 on the armature 20.

However, upon the voltage of the generator 1 exceeding that of the battery 12 by a predetermined value, the armature 20 is drawn in a counterclockwise direction, so as to cause the leaf spring contactor 24 to close contact 26.

The contactor 24 is connected through armature 20 and conductor 30 to line 2, while the contact 26 is connected through a conductor 35 to one end of the electromagnetic winding 14 of the line switch relay 10. The other end of the electromagnetic winding 14 is connected by a conductor 36 to the line 3.

Thus upon the closing of contact 26 by the contactor 24 the electromagnetic winding 14 is energized causing the line switch 10 to close contacts 10A and 10B and connecting line 2 to line 34.

Wound on the middle leg 18 and the third leg 19 of the E shaped core 15 are windings or current coils 37 and 38, respectively.

The windings 37 and 38 are connected in series in the main supply line 34 leading from line switch contact 10B to the positive terminal of the battery 12 and load 13. The windings 37 and 38 are wound of relatively large sized wire and winding 38 has a relatively smaller number of turns than the winding 37.

Upon the line switch 10 closing contacts 10A and 10B the windings 37 and 38 are energized. The winding 37 on the middle leg 19 aids the pull of the voltage coil 27 when current flows from the generator 1 to the battery 12 and load 13, but the current winding 37 tends to nullify this pull when the current flows in a reverse direction from the battery 12 to the generator 1.

The current winding 38 on the third leg 19 aids the effect of the winding 37 on the middle leg 18 and tends to bias the armature 20 in a clockwise direction or to its spring restrained position. The pull of this winding 38 does not exist unless the line switch 10 is closed and under normal line current conditions its pull is small. However, under large current surges the pull of the winding 38 is great.

In the latter event, the magnetic flux generated by the winding 38 will aid the spring 22 in rotating the armature 20 in a clockwise direction so as to open contacts 24 and 26 when the flux generated by the winding 37 tends to balance that of the winding 27. It is this additional force provided by the winding 38 which assures opening of the contacts 24 and 26 before the flux generated by the coil 37 has had a chance to build up sufficiently in a reverse direction to exceed the flux of the coil 27 or freeze the contacts 24 and 26 closed.

In the operation of the reverse current relay 15 thus described, it will be seen that upon initiating operation of the generator 1 a voltage will build up as the generator gains in speed and excitation. When this voltage is still below the predetermined operating value, which may be slightly above the voltage of the battery 12, the armature 20 remains spring retained and contacts 25 and 26 remain open. If the relay mechanism 15 is subjected to severe vibration under these conditions, the armature 20 may tend to move in a counterclockwise direction under such vibrational forces, but the same will be restrained by the spring force of the contactor 23 on closing contact 25 so that not sufficient movement is effected to close contact 26.

Therefore the electromagnetic winding 14 may not become energized during such vibrational conditions. Moreover, the closure of contact 25 does not produce added pull to the voltage coil 27 by virtue of the closing of the circuit to the differential coil 32 because the voltage of the generator 1 is still equal to or lower than the voltage of the battery 12.

When the voltage of the generator 1 increases in value slightly above the voltage of the battery 12 and reaches the predetermined operating value, the pull of the voltage coil 27 will cause contactor 23 to close contact 25. The closing of contact 25 will effect the energization of the differential coil 32 producing an additional pull on the armature 20, whereupon the armature 20 moves to cause contactor 24 to close contact 26 and to reach its final position.

The closing of contact 26 causes the energization of the winding 14 which effects the closing of the main line contacts 10A and 10B by switch 10 operated by the electromagnetic force of winding 14.

The closing of contacts 10A and 10B by the switch 10 causes current to flow to the battery 12 from the generator 1 and to any connected load through the series coils 37 and 38.

The line current, if flowing from the generator 1, causes the series coil 37 on the middle leg 18 to aid the pull of the voltage coil 27. The pull of the series coil 38 on the third leg 19 produces very little restraining pull as there are relatively few turns in the coil 38.

The addition of the magnetic force of the voltage coil 27 and the current coil 37 on the center leg 18 holds the armature 20 down with contacts 24 and 26 closed and with these contacts having sufficient overtravel the same will withstand severe vibrational forces. It will be noted that the differential coil 32 will be shorted out upon the closing of contacts 10A and 10B by the switch 10 and therefore the coil 32 is energized only during the closing period.

Should the voltage of the generator 1 drop below that of the battery 12, a reverse flow of current through the coil 37 will nullify in whole or in part the electromagnetic force of the voltage coil 27 and cause the armature 20 to be returned under the biasing force of the spring 22 to the original or open position. Should this reverse current become large, the pull of the coil 38 on the third leg 19 will be strong enough to bias the armature 20 so as to open the contacts 24 and 26 and return the armature 20 to its original open position.

Heretofore in the conventional type of reverse current relay, a heavy surge of current in the reverse direction would not allow the relay to open the main line circuit, because the magnetic flux generated by the current winding would overcome that generated by the voltage winding and exert sufficient additional force to hold the relay closed. In my present invention, however, the winding 38 adds to the effect of winding 37 in such a manner as to assure the opening of the relay contacts 24 and 26 upon such a reverse current surge.

In the latter operation, the magnetic flux generated by the winding 38 will be available to aid the spring 22 in rotating the armature 20 in a clockwise direction to thereby open the contacts 24 and 26 when the flux generated by the winding 37 has substantially or completely neutralized that of the winding 27. It is the extra force provided by the winding 38 that assures opening of the contacts 24 and 26 before the flux generated by the coil 37 has had a chance to build up sufficiently in a reverse direction to overcome the flux of the coil 27 and which might otherwise freeze the contacts 24 and 26 closed.

Although only one embodiment of the invention has been illustrated and described, various changes in the form and relative arrangements of the parts, which will now appear to those skilled in the art, may be made without departing from the scope of the invention. Reference is, therefore, to be had to the appended claims for a definition of the limits of the invention.

What is claimed is:

1. A relay mechanism to control connection and disconnection of a generator to a battery charging circuit, comprising, in combination, an E-shaped magnet core, a pair of coils wound on an outer leg of the E-shaped core, one of said coils responsive to the output voltage of the generator and the other of said coils responsive to the current flow between the generator and battery circuit, other current coils wound on the center leg and other outer leg of the E-shaped core and responsive to the flow of current between the generator and battery circuit, and an armature cooperating with the legs of said E-shaped core and including switch elements for connecting said current coils in and out of operation.

2. A relay mechanism to control connection and disconnection of a generator to a battery charging circuit, comprising, in combination, an E-shaped magnet core, a pair of coils wound on an outer leg of the E-shaped core, one of said coils responsive to the output voltage of the generator and the other of said coils responsive to the current flow between the generator and battery circuit, other current coils wound on the center leg and other outer leg of the E-shaped core and responsive to the flow of current between the generator and battery circuit, an armature pivotally mounted above the middle leg of the E-shaped core, the voltage coil being arranged so as to bias the armature toward the first mentioned outer leg, switch means carried by said armature for connecting said current coils in and out of operation, the current coil wound on the center leg being arranged so as to counteract the magnetic force of the voltage coil under conditions of reverse current flow from the battery to the generator, and the current coil wound on the other outer leg being arranged so as to assist the forces of the center leg current coil and to oppose the forces applied to the armature by the voltage coil so as to bias the armature away from the first mentioned outer leg and toward said other outer leg of the E-shaped core.

3. A relay mechanism to control connection and disconnection of a generator to a battery circuit, comprising, in combination, an E-shaped magnet core, an armature extending across the legs of said core and pivoted above the center leg of said core, a coil wound on one of the outer legs of said core and responsive to the output voltage of the generator, a second coil wound on said one outer leg, a third coil wound on the center leg, a forth coil wound on the other outer leg of said core, said third and fourth coils being connected in series, a first switch means operated by said armature, a second switch means operated by said armature, said first switch means closing a circuit between the generator and battery for energizing said second coil upon movement of the armature toward said one outer leg, and said second switch means effecting the closing of a circuit between said generator and battery for energizing said third and fourth coils upon further movement of said armature toward said one outer leg.

4. A relay mechanism to control connection and disconnection of a generator to a battery circuit, comprising, in combination, an E-shaped magnet core, an armature extending across the legs of said core and pivoted above the center leg of said core, a coil wound on one of the outer legs of said core and responsive to the output voltage of the generator, a second coil wound on said one outer leg, a third coil wound on the center leg, a fourth coil wound on the other outer leg of said core, said third and fourth coils being connected in series, a first switch means operated by said armature, a second switch means operated by said armature, said first switch means closing a circuit between the generator and battery for energizing said second coil upon movement of the armature toward said one outer leg, and said second switch means effecting the closing of a circuit between said generator and battery for energizing said third and fourth coils upon further movement of said armature toward said one outer leg, and spring means for biasing said armature in a direction towards said other outer leg for opening said circuits.

5. A relay mechanism to control connection and disconnection of a generator to a battery circuit, comprising, in combination, an E-shaped magnet core, an armature extending across the legs of said core and pivoted above the center leg of said core, a coil wound on one of the outer legs of said core and responsive to the output voltage of the generator, a second coil wound on said one outer leg, a third coil wound on the center leg, a fourth coil wound on the other outer leg of said core, said third and fourth coils being connected in series, a first switch means operated by said armature, a second switch means operated by said armature, said first switch means closing a circuit between the generator and battery for energizing said second coil upon movement of the armature toward said one outer leg, and said second switch means effecting the closing of a circuit between said generator and battery for energizing said third and fourth coils upon further movement of said armature toward said one outer leg, and said fourth coil for biasing said armature in a direction towards said other outer leg upon heavy current surges from said battery.

6. A relay mechanism to control connection and disconnection of a generator to a battery circuit, comprising, in combination, an E-shaped magnet core, an armature extending across the legs of said core and pivoted above the center leg of said core, a coil wound on one of the outer legs of said core and responsive to the output voltage of the generator, a second coil wound on said one outer leg, a third coil wound on the center leg, a fourth coil wound on the other outer leg of said core, said third and fourth coils being connected in series, a first switch means operated by said armature, a second switch means operated by said armature, said first switch means closing a circuit between the generator and battery for energizing said second coil upon movement of the armature toward said one outer leg, and said second switch means effecting the closing of a circuit between said generator and battery for energizing said third and fourth coils upon further movement of said armature toward said one outer leg, spring means for biasing said armature in a direction towards said other outer leg for opening said circuits, and said fourth coil for biasing said armature in a direction towards said other outer leg upon heavy current surges from said battery.

7. A relay mechanism to control connection and disconnection of a generator to a battery circuit, comprising, in combination, an E-shaped magnet core, an armature extending across the legs of said core and pivoted above the center leg of said core, a coil wound on one of the outer legs of said core and responsive to the output voltage of the generator, a second coil wound on said one outer leg, a third coil wound on the center leg, a fourth coil wound on the other outer leg of said core, said third and fourth coils being connected in series, a first switch means operated by said armature, a second switch means operated by said armature, said first switch means closing a circuit between the generator and battery for energizing said second coil upon movement of the armature toward said one outer leg, and said second switch means effecting the closing of a circuit between said generator and battery for energizing said third and fourth coils upon further movement of said armature toward said one outer leg, one of said contacts in the form of a leaf spring for engaging a fixed contact so as to prevent the other switch contact from closing under accelerational forces the circuit controlled thereby, and spring means for biasing said armature in a direction towards said other outer leg for opening said circuits.

WILLIAM R. HOLMES.

REFERENCES CITED

The following references are of record in the file of this patent:

UNITED STATES PATENTS

| Number | Name | Date |
| --- | --- | --- |
| 1,752,900 | Eisenmann | Apr. 1, 1930 |
| 1,886,629 | Blake | Nov. 8, 1932 |
| 2,285,937 | Mishelevich | June 9, 1942 |